United States Patent
Sako et al.

(10) Patent No.: US 7,415,191 B2
(45) Date of Patent: Aug. 19, 2008

(54) REPRODUCTION DEVICE AND REPRODUCTION METHOD

(75) Inventors: Yoichiro Sako, Tokyo (JP); Makoto Inoue, Kanagawa (JP); Katsuya Shirai, Kanagawa (JP); Yasushi Miyajima, Kanagawa (JP); Kenichi Makino, Kanagawa (JP); Motoyuki Takai, Tokyo (JP); Toshiro Terauchi, Tokyo (JP); Akiko Inoue, Saitama (JP)

(73) Assignee: Sony Corporation, Tokyo (JP)

( * ) Notice: Subject to any disclaimer, the term of this patent is extended or adjusted under 35 U.S.C. 154(b) by 688 days.

(21) Appl. No.: 10/512,084

(22) PCT Filed: Mar. 31, 2004

(86) PCT No.: PCT/JP2004/004716

§ 371 (c)(1),
(2), (4) Date: Nov. 8, 2004

(87) PCT Pub. No.: WO2004/091199

PCT Pub. Date: Oct. 21, 2004

(65) Prior Publication Data
US 2005/0207725 A1    Sep. 22, 2005

(30) Foreign Application Priority Data
Apr. 8, 2003    (JP)    ............................... 2003-103532

(51) Int. Cl.
*H04H 60/33*    (2008.01)
*G06K 9/00*    (2006.01)

(52) U.S. Cl. .............................. 386/95; 386/46; 386/83; 386/124; 725/9; 382/117

(58) Field of Classification Search ................... 386/46, 386/83, 95, 117, 125, 126; 725/9, 52; 382/118; 348/15, 17, 384
See application file for complete search history.

(56) References Cited

U.S. PATENT DOCUMENTS
4,513,317 A    4/1985    Ruoff, Jr.
(Continued)

FOREIGN PATENT DOCUMENTS
JP    9-9229    1/1997
(Continued)

OTHER PUBLICATIONS
Glenstrup et. al., "Eye Controlled Media: Preent and Future State," University of Copenhagen DIKU Universitetsparken 1 DK 2100 Denmark, 1995.*
(Continued)

*Primary Examiner*—Thai Tran
*Assistant Examiner*—Mishawn Dunn
(74) *Attorney, Agent, or Firm*—Oblon, Spivak, McClelland, Maier & Neustadt, P.C.

(57) ABSTRACT

Reproducing characteristics of an audio sound are controlled by an audio controller 8 and reproducing characteristics of a video image are controlled by a video controller 11. Whether or not a viewpoint of the user is directed to a display 13 side of a television receiver is detected by a viewpoint detector 14. On the basis of a detection signal from the viewpoint detector 14, a discriminating unit 15 discriminates which of a normal monitoring state, a "while watching" state, and the "concentration" state the present state corresponds to, and generates a control signal to control the reproducing characteristics so as to be adaptive to the state. If it is determined that the present state changes from the "while watching" state to the "concentration" state, a sound volume is reduced and the reproducing characteristics are automatically switched so as not to obstruct the concentration.

21 Claims, 3 Drawing Sheets

U.S. PATENT DOCUMENTS

| | | | | |
|---|---|---|---|---|
| 4,931,865 A | * | 6/1990 | Scarampi | 725/12 |
| 6,078,349 A | * | 6/2000 | Molloy | 348/14.07 |
| 7,003,139 B2 | * | 2/2006 | Endrikhovski et al. | 382/118 |
| 7,171,108 B1 | * | 1/2007 | Masters et al. | 386/83 |
| 2004/0013398 A1 | * | 1/2004 | Miura et al. | 386/46 |

FOREIGN PATENT DOCUMENTS

| | | |
|---|---|---|
| JP | 11-288259 | 10/1999 |
| JP | 2000-059745 * | 2/2000 |
| JP | 2001-100870 | 4/2001 |
| WO | 01/084838 | 11/2001 |

OTHER PUBLICATIONS

Patent Abstracts of Japan, JP 2001-128134, May 11, 2001.
Patent Abstracts of Japan, JP 09-275533, Oct. 21, 1997.
Patent Abstracts of Japan, JP 08-018950, Jan. 19, 1996.
Patent Abstratcs of Japan, JP 08-018950, Jan. 19, 1996.

* cited by examiner

REPRODUCTION DEVICE AND REPRODUCTION METHOD

TECHNICAL FIELD

The invention relates to a reproducing apparatus and a reproducing method which can be applied to, for example, a television receiver.

BACKGROUND ART

There is a case where the user studies or reads a book while watching a television receiver. Such a state is what is called a "while watching" state.

A technique for setting luminance or the like of the television receiver to a desired luminance level every user by using biological information and personal authentication of the user has been disclosed in JP-A-10-211177.

The "while watching" state is the state where the user is interested both in the monitoring of the television receiver and another work such as study or the like. There occurs a case where the state changes from the "while watching" state to a state where the user concentrates on some other work such as writing of sentences or the like (such a state is properly referred to as "concentration"). In the "concentration" state, there is a case where the user feels that a video image or an audio sound of the television receiver obstructs the concentration. A technique for changing reproducing characteristics of the video image or audio sound which is reproduced in accordance with "while watching" and "concentration" is not disclosed in JP-A-10-211177.

It is, therefore, an object of the invention to provide a reproducing apparatus and a reproducing method for changing reproducing characteristics of at least either of a video image and an audio sound in accordance with the "while watching" state and the "concentration" state.

DISCLOSURE OF INVENTION

To solve the above problem, according to the invention, there is provided a reproducing apparatus comprising:

reproducing means for reproducing video data and audio data;

viewpoint detecting means for detecting a viewpoint of the user;

discriminating means for discriminating a degree of an interest of the user in the video data and the audio data which are reproduced from detection information obtained by the viewpoint detecting means; and control means for changing reproducing characteristics of at least either of the video data and the audio data on the basis of a discrimination result obtained from the discriminating means.

According to the invention, there is provided a reproducing method comprising:

a viewpoint detecting step of detecting a viewpoint of the user;

a discriminating step of discriminating a degree of an interest of the user in video data and audio data which are reproduced from detection information obtained by the viewpoint detecting step; and a control step of changing reproducing characteristics of at least either of the video data and the audio data on the basis of a discrimination result obtained from the discriminating step.

According to the invention, the degree of the interest of the user in the video data and the audio data which are reproduced is discriminated by discriminating a target of the viewpoint of the user. A first state (normal monitoring state) where the user monitors the video image and the audio sound which are reproduced, a second state ("while watching" state) where he monitors the video image and the audio sound which are reproduced while doing another work, and a third state ("concentration" state) where he concentrates on some other work are included in the degree of the interest. The reproducing characteristics of at least either of the video image and the audio sound are controlled in accordance with each state on the basis of the discrimination result.

BEST MODE FOR CARRYING OUT THE INVENTION

Figure 1:
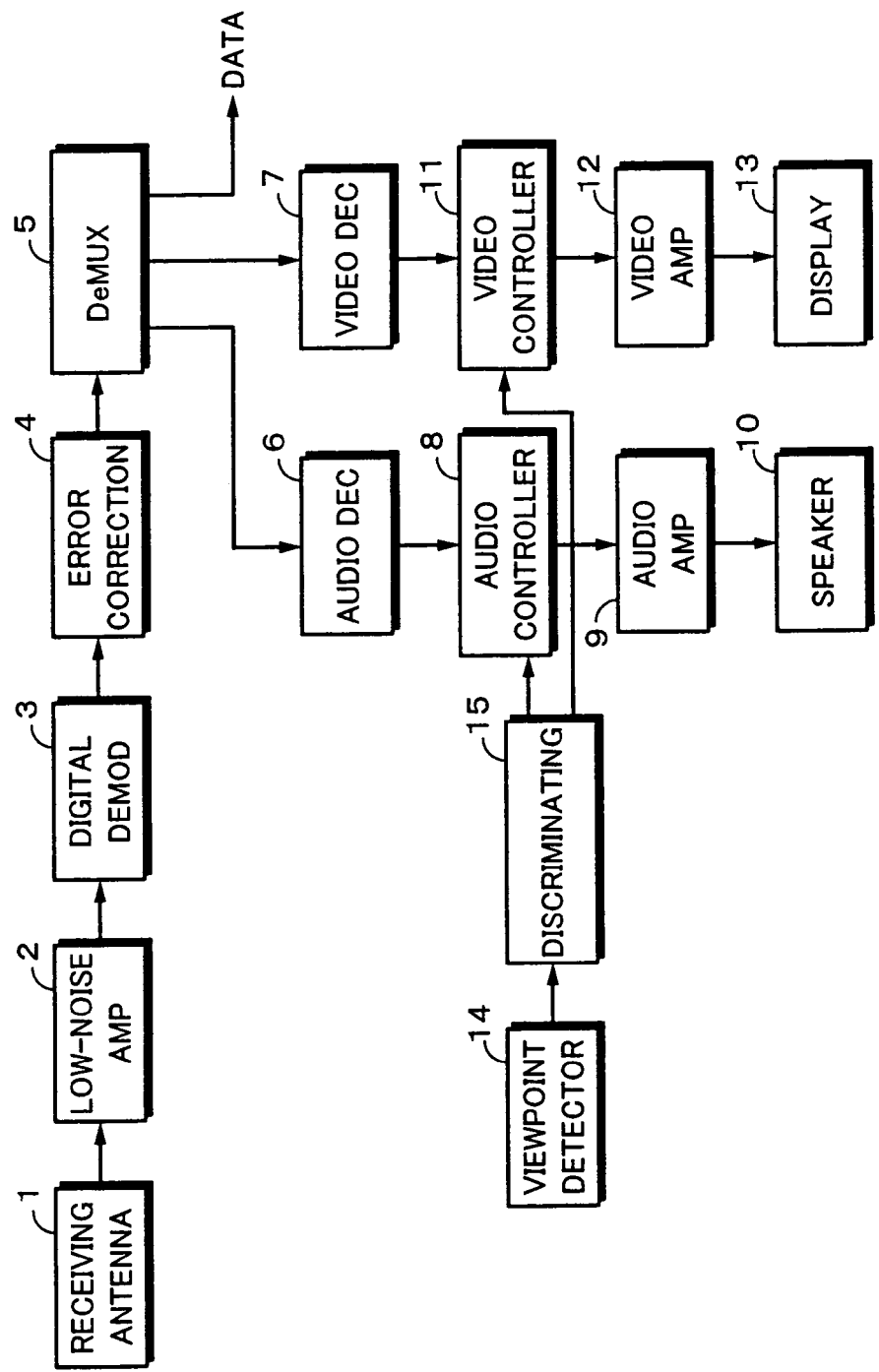
FIG. 1 is a block diagram showing a construction of a reproducing apparatus according to an embodiment of the invention.

An embodiment of a data reproducing apparatus according to the invention will be described hereinbelow with reference to FIG. 1. FIG. 1 shows a whole television receiver for receiving a digital broadcasting as a whole. Reference numeral 1 denotes a receiving antenna. A signal received by the receiving antenna 1 is amplified to a level necessary for demodulation in a low-noise amplifier 2. An output signal of the low-noise amplifier 2 is supplied to a digital demodulator 3.

The digital demodulator 3 extracts information embedded in an amplitude or a phase of a carrier. The digital demodulator 3 is constructed by, for example, a carrier reproducing circuit, a sync detecting circuit, a symbol timing circuit, and a code discriminating circuit. An output signal of the digital demodulator 3 is supplied to an error correction circuit 4. On the transmitting side, an error correction code is added to the signal and a code error which occurred on a transmission path is corrected in the error correction circuit 4. An output signal of the error correction circuit 4 is supplied to a demultiplexer 5.

The demultiplexer 5 separates multiplexed video image, audio sound, and data and outputs them. The separated audio information is decoded by an audio decoder 6. The separated video information is decoded by a video decoder 7. For example, the video decoder 7 executes the decoding of MPEG2 (Moving Picture Experts Group Phase 2). In the case of digital broadcasting, in many cases, transmission data has been scrambled, thereby enabling only a specific viewer to receive it. In such a case, a descrambler to descramble the scramble is provided.

The digital audio signal from the audio decoder 6 is supplied to a speaker 10 through an audio controller 8 and an audio amplifier 9. Actually, two audio signal paths are provided in correspondence to right and left stereophonic channels. The digital video signal from the video decoder 7 is supplied to a display 13 through a video controller 11 and a video amplifier 12. A video signal processing circuit is provided as necessary. The display 13 is a CRT (Cathode Ray Tube), an FPD (Flat Panel Display), or the like. A D/A converter for converting the digital signal into an analog signal is provided for each of the audio controller 8 and the video controller 11. Control of reproducing characteristics of the audio sound and the video image as will be explained hereinafter can be made in a digital or analog manner.

Reference numeral 14 denotes a viewpoint detector for detecting whether or not a viewpoint of the user is directed to the display 13 side of the television receiver. That is, the viewpoint detector 14 detects whether a target of the viewpoint is the display or something else. When the viewpoint is directed to the display side, it is possible to presume that the user is either in the monitoring state where he is monitoring the audio sound and the video image reproduced by the television receiver or the "while watching" state where he is monitoring the audio sound and the video image while doing another work such as study, reading of a book, or the like. When the viewpoint is not directed to the display, it is possible to presume that the user is in the "concentration" state where his interest is directed only to another work.

A detection signal from the viewpoint detector 14 is supplied to a discriminating unit 15. Control signals to the audio controller 8 and the video controller 11 are generated from the discriminating unit 15. The discriminating unit 15 discriminates in which of the normal monitoring state, the "while watching" state, and the "concentration" state the user is and generates the control signal to control the reproducing characteristics of the audio signal and the video signal in accordance with the state. How to make the control has been preset and the user can change contents of the control.

The audio controller 8 controls, for example, a sound volume level by the control signal from the discriminating unit 15. A sound volume in the monitoring state is set to the optimum (this means the level upon reception of the normal broadcasting or a level higher than it). A sound volume in the "concentration" state is set to the minimum (including the off state of the audio sound). A sound volume in the "while watching" state is set to a level between those levels.

It is also possible to design the audio controller 8 so as to vary a frequency band or emphasize or suppress a predetermined frequency band. For example, a band width in the monitoring state is set to the widest width (this means a band width upon the normal broadcasting reception or a width wider than it). A band width in the "concentration" state is set to the narrowest width. A band width in the "while watching" state is set to a width between those widths. The band width is narrowed by cutting components on the high band side or the low band side. Further, a boost amount of the components of the high band side and that of the low band side can be also controlled. That is, a boost amount in the "concentration" state is set to the minimum amount. Further, it is also possible to combine two or more of the above audio control methods.

The video controller 11 controls the reproducing characteristics of the video image, for example, a luminance level by the control signal from the discriminating unit 15. A luminance level in the monitoring state is set to the optimum (this means the luminance level upon the normal broadcasting reception or a luminance level higher than it). A luminance level in the "concentration" state is set to the minimum (including the off state of the video image). A luminance level in the "while watching" state is set to a level between those levels. It is also possible to design the video controller 11 so as to control resolution. For example, resolution in the monitoring state is set to the optimum value (this means the resolution upon the normal broadcasting reception or resolution higher than it). Resolution in the "concentration" state is set to the minimum value. Resolution in the "while watching" state is set to a value between those values. It is also possible to control contrast besides the luminance level and the resolution. Further, it is also possible to display a substitution video image (scenery or the like) without displaying the television video image upon concentration.

The viewpoint detector 14 is constructed in such a manner that, for example, an image pickup device such as a CCD or the like is attached to the reproducing apparatus such as a television receiver or the like and whether the user is watching the display 13 (monitoring state), sometimes watches the display ("while watching" state), or does not watch at all ("concentration" state) is discriminated by analyzing the photographed image. In the viewpoint detector 14, a duration of the time when the user is watching the display side is detected every predetermined time interval such as 5 minutes, 10 minutes, or the like.

As another construction of the viewpoint detector 14, it can be also constructed by: a light emitting device such as a light emitting diode or the like attached in a position that is as close as possible to the user's eyes; and a photosensing unit which is provided for the television receiver and receives light from the light emitting device. Only when the viewpoint of the user is directed to the display side of the television receiver, the photosensing unit can receive the light from the light emitting diode. It is also possible to construct the viewpoint detector 14 in such a manner that a direction sensor is provided for the head, face, or the like of the user, whether or not he is directed to the front display side is detected, and a detection result is transmitted to the television receiver in a wireless manner.

The viewpoint detector 14 is not limited to such a construction that the target of the viewpoint of the user is detected but can be also constructed so as to detect a change in viewpoint. That is, one of the "while watching" state, the monitoring state, and the "concentration" state is discriminated from a degree of motion of the eyes. For example, a case where the eyes of the user are relatively stationary is determined to be the monitoring state and a case where his eyes are moving is determined to be the "while watching" state. The "concentration" state is detected when the viewpoint is not directed to the display.

Figure 2:
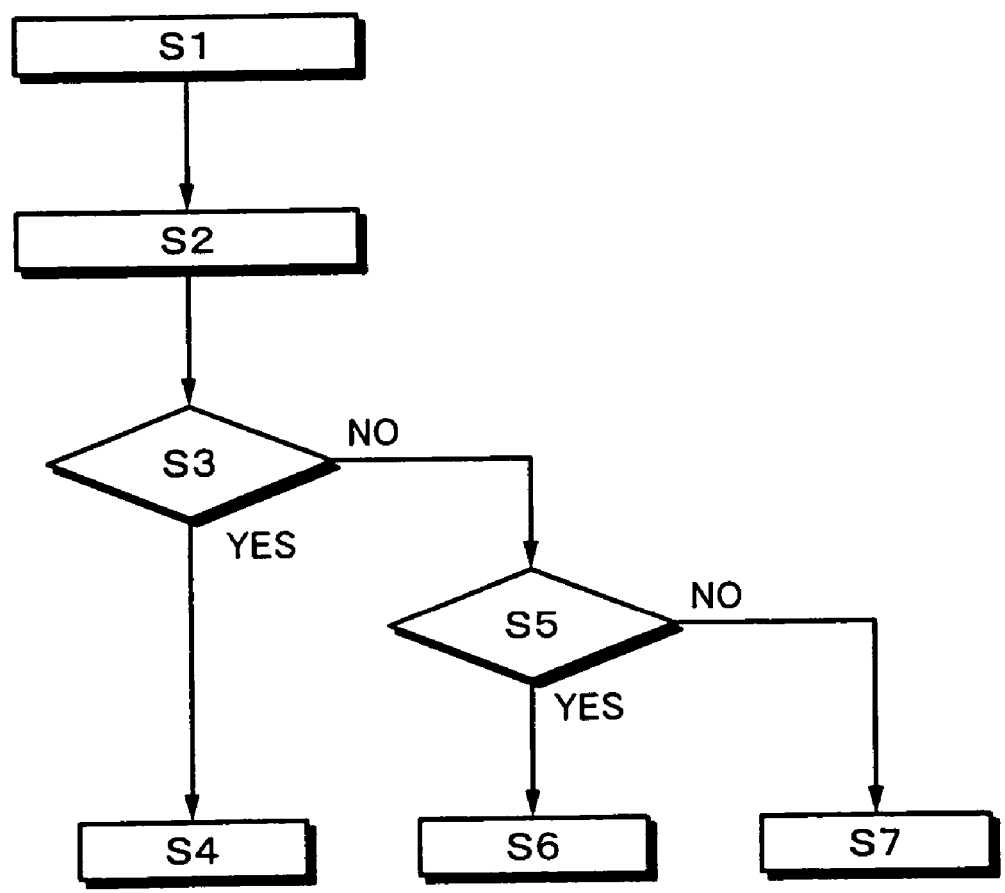
FIG. 2 is a flowchart for explaining the operation of the embodiment of the invention.

FIG. 2 is a flowchart showing a flow for processes in the discriminating unit 15 in the embodiment of the invention. In step S1, the viewpoint is detected by the viewpoint detector 14. In step S2, a ratio at which the user is watching the display of the television receiver is detected from a detection result. For example, the total of the time duration when the user is watching the display is calculated every predetermined interval of time.

In step S3, whether or not the ratio of the display watching is very high (for example, 90% or more) is discriminated. If it is determined that the ratio is equal to or higher than 90%, the video signal and the audio signal are controlled to the normal state where the user is watching the television broadcasting (in FIG. 2, such a state is expressed as a standard reproduction) in step S4. In this monitoring state, the video signal and the audio signal are reproduced in accordance with the reproducing characteristics which are optimum to the user.

If it is determined in step S3 that the ratio is lower than 90%, whether or not the ratio is equal to or higher than, for example, 10% is discriminated in next step S5. If YES, it is determined that the user is in the "while watching" state. In step S6, the reproducing characteristics of the video signal and the audio signal are controlled to those adapted to the "while watching" state. If it is determined in step S5 that the ratio of the display watching is lower than 10%, the state is determined to be the "concentration" state. In step S7, the reproducing characteristics of the video signal and the audio signal are controlled to those adapted to the "concentration" state.

In the embodiment of the invention mentioned above, if the user wants to concentrate on some other work in the "while watching" state where he is doing another work while monitoring the television, at least either of the video image and the audio sound to be reproduced is reproduced in accordance with characteristics so as not to obstruct the concentration. Since those reproducing modes are automatically switched, the user does not need to operate keys or the like.

Figure 3:
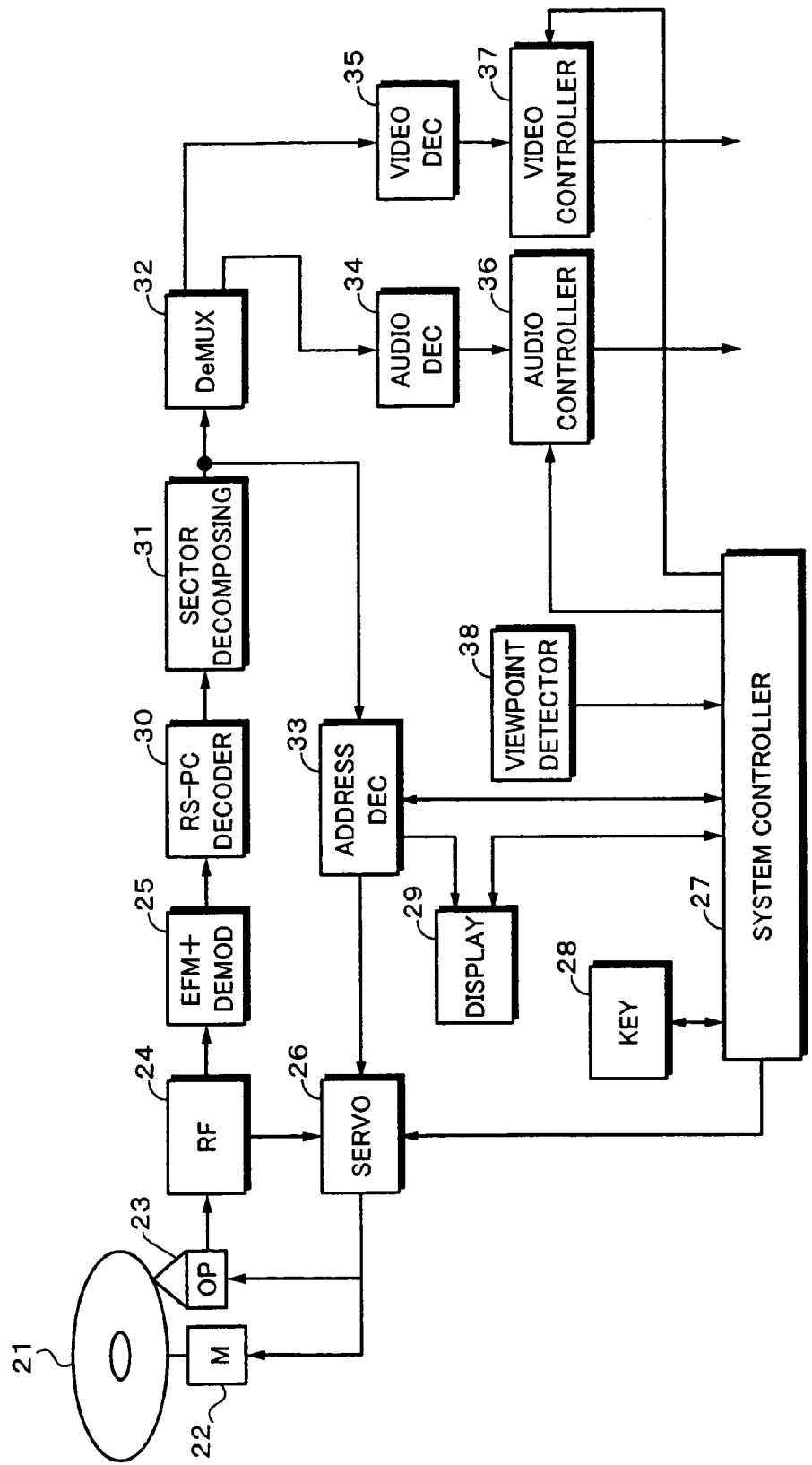
FIG. 3 is a block diagram showing a construction of a reproducing apparatus according to another embodiment of the invention.

Another embodiment in which the invention is applied to a disc reproducing apparatus will now be described with reference to FIG. 3. In FIG. 3, reference numeral 21 denotes a disc, for example, a DVD (Digital Versatile Disc) formed in mastering and replicating steps; 22 a spindle motor for rotating the disc 21; and 23 an optical pickup for reproducing a signal recorded on the disc 21.

The optical pickup 23 is constructed by: an optical system comprising a semiconductor laser for irradiating a laser beam onto the disc 21, an objective lens, and the like; a detector for detecting the return light from the disc 21; a focusing and tracking mechanism; and the like. Further, the optical pickup 23 is moved in the radial direction of the disc 21 by a sled mechanism (not shown). While converging the laser beam from the semiconductor laser onto a signal surface of the optical disc 21, the optical pickup 23 records data onto a track formed spirally on the optical disc 21. The whole optical pickup 23 is moved by the sled mechanism.

Output signals from, for example, 4-split detectors of the optical pickup 23 are supplied to an RF unit 24. The RF unit 24 forms a reproduction (RF) signal, a focusing error signal, and a tracking error signal by arithmetically operating the output signals of the 4-split detectors. The reproduction signal is supplied to an EFM-plus (EFM+) demodulating unit 25 and subjected to a process of demodulation of EFM-plus. In EFM-plus, a data symbol of 8 bits is converted into a code word of 16-channel bits. Four kinds of tables are prepared as code conversion tables for such conversion. A desired one of the tables is selected in accordance with State 1 to State 4 at that time. A state after the code word is selected (next state) has been specified in each table.

The focusing error signal and the tracking error signal are supplied to a servo unit 26. On the basis of reproduction clocks of the RF signal, the servo unit 26 controls the rotating operation of the spindle motor 22 and controls a focusing servo and a tracking servo of the optical pickup 23. A control signal is supplied to the servo unit 26 from a system controller 27 for controlling the operation of the whole reproducing apparatus, thereby enabling the pickup to access a desired position on the disc 21. A key 28 which is operated by the user and a display unit 29 are provided in association with the system controller 27. The display unit 29 comprises a liquid crystal display and displays an operating mode, a reproducing position, and the like.

Digital data from the EFM+ demodulating unit 25 is supplied to an RS-PC (Reed-Solomon Product Code) decoder 30 and subjected to an error correcting process. RS-PC is an error correction code in which a Reed-Solomon code and a product code are combined. An output signal of the RS-PC decoder 30 is supplied to a sector decomposing circuit 31. An output signal of the sector decomposing circuit 31 is supplied to a demultiplexer 32 and an address decoder 33.

A reproducing address is obtained by the address decoder 33 and supplied to the servo unit 26, system controller 27, and display unit 29. In the servo unit 26, the access to the target position on the disc is controlled by using the reproducing address. In the display unit 29, the position where the reproduction is being executed is displayed.

In the demultiplexer 32, the coded audio data and the coded video data are separated. The coded audio data is decoded in an audio decoder 34 and the audio data from the audio decoder 34 is supplied to an audio controller 36. The audio controller 36 controls the reproducing characteristics of the audio sound by a control signal from the system controller 27. The coded video data is decoded in a video decoder 35 and the video data from the video decoder 35 is supplied to a video controller 37. The video controller 37 controls the reproducing characteristics of the audio sound by a control signal from the system controller 27.

A D/A converter for converting the digital signal into the analog signal is provided for each of the audio controller 36 and the video controller 37. The reproducing characteristics of the audio signal and the video signal are controlled by a digital or analog process in a manner similar to the case in the foregoing embodiment. The audio signal outputted from the audio controller 36 is supplied to the speaker through an audio amplifier (not shown). The video signal outputted from the video controller 37 is supplied to the display through a video amplifier (not shown).

A viewpoint detector 38 similar to that in the foregoing embodiment is provided. A detection signal from the viewpoint detector 38 is supplied to the system controller 27. The system controller 27 executes processes similar to those described with reference to FIG. 2, discriminates which of the normal monitoring state, the "while watching" state, and the "concentration" state the present state of the user corresponds to in accordance with a ratio of the display watching, and generates a control signal according to a discrimination result. Control to the audio sound and the video image is made in a manner similar to that in the foregoing embodiment.

Also in another embodiment of the invention mentioned above, if the user wants to concentrate on some other work in the "while watching" state where he is doing another work while watching video software such as a movie or the like recorded on the disc 21, at least either of the video image and the audio sound to be reproduced is reproduced in accordance with characteristics so as not to obstruct the concentration. Since those reproducing modes are automatically switched, the user does not need to operate keys or the like.

The invention is not limited to the foregoing embodiment or the like of the invention but many variations and modifications are possible within the scope of the invention without departing from the spirit of the invention. For example, the invention is not limited to the television receiver and the disc reproducing apparatus but can be also applied to other reproducing apparatuses such as VTR, projector, personal computer, and the like.

As will be obviously understood from the above description, according to the invention, if the user wants to concentrate on some other work in the "while watching" state, the reproducing modes can be automatically switched so that at least either of the video image and the audio sound to be reproduced is reproduced in accordance with characteristics so as not to obstruct the concentration. The normal monitoring state where the user is monitoring the video image and the audio sound and the "while watching" state can be automatically switched.

The invention claimed is:

1. A reproducing apparatus comprising:
reproducing means for reproducing video data and audio data;
viewpoint detecting means for detecting a viewpoint direction of eyes of a user relative to said reproducing means and providing a viewpoint output;

discriminating means for discriminating a degree of an interest of said user in the video data and the audio data based on said viewpoint output; and control means for changing at least one reproducing characteristic of at least either of said video data and said audio data based on a discrimination result obtained from said discriminating means.

2. The reproducing apparatus according to claim 1, wherein said viewpoint detecting means includes means for detecting user eye movement.

3. The reproducing apparatus according to claim 1, wherein said reproducing means includes a display on which said video data is displayed and said detecting a viewpoint direction of the eyes of the user is done relative to said display of said reproducing means.

4. The reproducing apparatus according to claim 1, wherein said control means controls at least one reproducing characteristic of the audio data.

5. The reproducing apparatus according to claim 4, wherein said control means controls a sound volume level of said audio data on the basis of said discrimination result.

6. The reproducing apparatus according to claim 4, wherein said control means changes a frequency band of said audio data on the basis of said discrimination result.

7. The reproducing apparatus according to claim 4, wherein said control means executes emphasis or suppression of a predetermined frequency band of said audio data on the basis of said discrimination result.

8. The reproducing apparatus according to claim 1, wherein said control means controls at least one reproducing characteristic of the video data.

9. The reproducing apparatus according to claim 8, wherein said control means controls a luminance level of said video data on the basis of said discrimination result.

10. The reproducing apparatus according to claim 8, said control means controls resolution of said video data on the basis of said discrimination result.

11. A reproducing apparatus comprising:
reproducing means for reproducing video data and audio data;
viewpoint detecting means for detecting a viewpoint of a user;
discriminating means for discriminating a degree of an interest of said user in the video data and the audio data which are reproduced from detection information obtained by said viewpoint detecting means; and
control means for changing reproducing characteristics of at least either of said video data and said audio data on the basis of a discrimination result obtained from said discriminating means,
wherein said discriminating means discriminates a state of said user on the basis of a ratio at which the viewpoint is detected for a predetermined time by said viewpoint detecting means.

12. The reproducing apparatus according to claim 11, wherein said control means reproduces the video data when the ratio of the viewpoint which is detected by said discriminating means is large, and said control means stops the reproduction of said video data and reproduces data other than said video data when the ratio of the viewpoint is small.

13. The reproducing apparatus according to claim 11, wherein said discriminating means discriminates at least two of the following three states:
a first state where the user monitors the reproduced video data and audio data;
a second state where the user monitors the reproduced video data and audio data while doing another work; and
a third state where the user concentrates on said another work.

14. A reproducing method comprising:
a step of reproducing one or both of video data and audio data from a reproducing device;
a step of detecting at least one viewpoint direction of eyes of a user relative to said reproducing device and outputting an indication of said at least one viewpoint direction;
a step of discriminating a degree of an interest of the user in the one or both of video data and audio data which are reproduced from the reproducing device based on said indication of said at least one viewpoint direction; and
a control step of changing at least one reproducing characteristic of at least either of said video data and said audio data on the basis of a discrimination result obtained from said step of discriminating.

15. The reproducing method according to claim 14, wherein said step of detecting includes detecting user eye movement.

16. A reproducing method comprising:
a viewpoint detecting step of detecting a viewpoint of a user;
a discriminating step of discriminating a degree of an interest of the user in video data and audio data which are reproduced from detection information obtained by said viewpoint detecting step; and
a control step of changing reproducing characteristics of at least either of said video data and said audio data on the basis of a discrimination result obtained from said discriminating step,
wherein said discriminating step is a step of discriminating a state of said user on the basis of a ratio at which the viewpoint is detected for a predetermined time by said viewpoint detecting step.

17. A reproducing method according to claim 16, wherein in said discriminating step, at least two of the following three states are discriminated:
a first state where the user monitors the reproduced video data and audio data;
a second state where the user monitors said reproduced video data and audio data while doing another work; and
a third state where the user concentrates on said another work.

18. A reproducing apparatus comprising:
a reproducing device configured to reproduce one or both of video data and audio data;
an eye viewpoint detector configured to detect a viewpoint direction of eyes of a user relative to said reproducing device and providing an eye viewpoint output;
a discriminating unit configured to discriminate a degree of an interest of said user in the one or both of the video data and the audio data being reproduced by the reproducing device based on said eye viewpoint output; and
a controller configured to change reproducing characteristics of at least either of said video data and said audio data based on a discrimination result obtained from said discriminating unit.

19. The reproducing apparatus according to claim 18, wherein said eye viewpoint detector includes a detector to detect user eye movement.

20. The reproducing apparatus according to claim 18, wherein said controller is configured to control a reproducing characteristic of the audio data.

21. The reproducing apparatus according to claim 18, wherein said controller is configured to control a reproducing characteristic of the video data.

* * * * *